United States Patent [19]

Ohsumi et al.

[11] Patent Number: 5,338,592
[45] Date of Patent: Aug. 16, 1994

[54] PRODUCTION METHOD FOR COMPOSITE MOLDED ARTICLE

[75] Inventors: Hisayoshi Ohsumi; Takeshi Matsumoto; Shinji Kato; Mitsuo Ishizuka; Shoichi Kaneko, all of Hamamatsu, Japan

[73] Assignee: Yamaha, Japan

[21] Appl. No.: 941,411

[22] Filed: Sep. 8, 1992

[30] Foreign Application Priority Data

Sep. 6, 1991 [JP] Japan .................................. 3-227505

[51] Int. Cl.$^5$ .............................................. B32B 31/14
[52] U.S. Cl. ................................... 428/106; 156/153; 156/242; 156/245; 156/307.3; 156/307.4; 156/308.6; 156/314; 156/324.4; 264/328.1; 264/328.6; 428/537.1
[58] Field of Search ............ 156/242, 245, 314, 324.4, 156/307.3, 307.4, 308.6, 153; 264/328.1, 328.6; 428/537.1, 106

[56] References Cited

U.S. PATENT DOCUMENTS

| | | | |
|---|---|---|---|
| 2,804,418 | 8/1957 | King | 156/242 |
| 3,877,786 | 4/1975 | Booras et al. | 264/129 |
| 4,002,790 | 1/1977 | Trewiler | 156/242 |
| 4,902,594 | 2/1990 | Platzer | 156/230 |

FOREIGN PATENT DOCUMENTS 2258320 10/1990 Japan .................................. 156/242

*Primary Examiner*—Caleb Weston
*Attorney, Agent, or Firm*—Ostrolenk, Faber, Gerb & Soffen

[57] ABSTRACT

The front surface of a wooden overlay sheet, having a wooden material on the front surface thereof, is subjected to a color treatment with a colorant comprising a primer resin; the wooden overlay sheet, which was subjected to color treatment, is positioned in a metal mold for molding, and a transparent resin layer is molded on the front surface thereof by means of injection-molding. Furthermore, a synthetic resin core material is molded on the rear surface of the wooden overlay sheet. A composite molded article is thereby produced, wherein a synthetic resin core material is molded on the rear surface of the wooden overlay material, and a transparent resin layer is molded on the front surface of the wooden overlay sheet. Thus, the present invention enables the enhancement of the outer appearance of the product and the enhancement of the adhesion of the wooden overlay sheet and the transparent resin layer.

20 Claims, 4 Drawing Sheets

PRODUCTION METHOD FOR COMPOSITE MOLDED ARTICLE

BACKGROUND OF THE INVENTION

1. Field of the Invention

The present invention relates to a production method of a composite molded article consisting of a wooden overlay sheet having a wooden material at the front surface thereof, and of a synthetic resin core material.

2. Prior Art

Hitherto, composite molded articles consisting of a wooden overlay sheet having a wooden material at the front surface thereof and a synthetic resin core material have been employed as, for instance, high grade furniture material and interior material for use in luxury vehicles.

Such a composite molded article, as is for instance shown in FIG. 1, having a structure wherein a synthetic resin core material 2 is injection-molded on the rear side of a wooden overlay sheet 1, and a transparent synthetic resin layer 3 is injection-molded on the front surface of wooden overlay sheet 1 so as to form a unit, has been proposed (Japanese Patent Application First Publication No. 3-30922).

With such a composite molded article 4, a realistic woody texture is obtained because a transparent resin layer 3 is formed on the front surface of wooden overlay sheet 1. Furthermore, painting of the surface is not required, thus facilitating production, enhancing productivity, and reducing production costs.

Furthermore, such a composite molded article 4 can be produced in the following way when using, for instance, a two layer injection-molding device provided with two injection units. First, wooden overlay sheet 1 is placed inside the metal mold of an injection-molding device; the mold is closed and molding is performed; then, on the rear side of wooden overlay sheet 1, a synthetic resin is injected by the injection unit of one side and synthetic resin core material 2 is molded. Next, a transparent synthetic resin is injected on the front surface of wooden overlay sheet 1 by means of the injection unit of the other side, transparent resin layer 3 is molded, and the composite molded article is produced.

It is efficient to subject the front surface of wooden overlay sheet 1 to coloring and painting prior to molding in order to enhance the outward appearance of composite molded article 4 as a product. For coloring and painting, conventional synthetic resin colorants for use with wooden materials, such as a urethane-based colorant to which a color pigment has been added, or an acryl-based colorant, are employed.

However, when using a urethane-based colorant for coloring the wooden overlay sheet 1, after subjecting the front surface of wooden overlay sheet 1 to coloring treatment, and subsequent molding of transparent layer 3 on the front surface, the miscibility of the colorant and transparent layer 3 is inferior and there is the danger of a peel-off of transparent layer 3 at the interface of wooden overlay sheet 1 and transparent resin layer 3. Furthermore, when employing an acryl-based colorant, the heat resistance of this colorant is limited and therefore the colorant flows when molding the transparent resin layer 3 by means of injection-molding, and there is the disadvantage that patterns are formed on the front surface and that the outer appearance of the product is negatively affected.

SUMMARY OF THE INVENTION

The present invention relates to a production method for a composite molded article, provided with a wooden overlay sheet having a wooden material on the front surface thereof, a synthetic resin core material molded on the rear side of the wooden overlay sheet, and a transparent resin layer molded on the front surface of the wooden overlay sheet, characterized in comprising a) a process, wherein the front surface of the wooden overlay sheet is subjected to coloring treatment with a colorant comprising a primer resin, b) a process, wherein the wooden overlay sheet, which had been subjected to coloring treatment, is placed in a metal mold for molding, and a transparent resin layer is molded on the front surface thereof by means of injection-molding, and c) a process, wherein a synthetic resin core material is molded on the rear surface of the wooden overlay sheet.

According to the production method of the present invention, by subjecting the front surface of the wooden overlay sheet to coloring processing, it is possible to enhance the outer appearance of the product. Since a primer resin is used as a colorant, the colorant does not flow on the front surface which was subjected to coloring treatment; therefore, even when performing injection-molding of the transparent resin, and it is possible to prevent deterioration of the outer appearance of the product. Furthermore, the miscibility of the colorant and the transparent resin layer is good, and thus it is possible to enhance the adhesion of the wooden overlay sheet and the transparent resin layer, and to prevent the separation thereof.

Accordingly, it is possible to obtain a composite molded article with an apparently realistic woody texture wherein a transparent resin layer is molded on the front surface of the wooden overlay sheet. Furthermore, it is not required to perform painting on the front surface of the composite molded article, and it is therefore possible to facilitate production, enhance productivity, and reduce production cost.

DETAILED DESCRIPTION OF THE PREFERRED EMBODIMENTS

Figure 4:
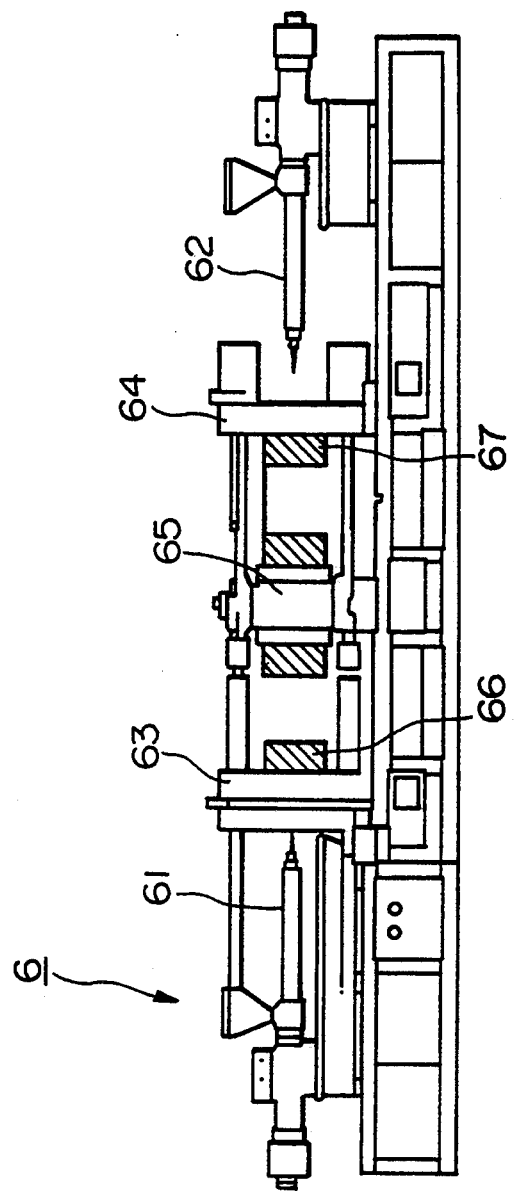
FIG. 4 is a side view showing an example of a two-layer injection molding device.
Figure 5:
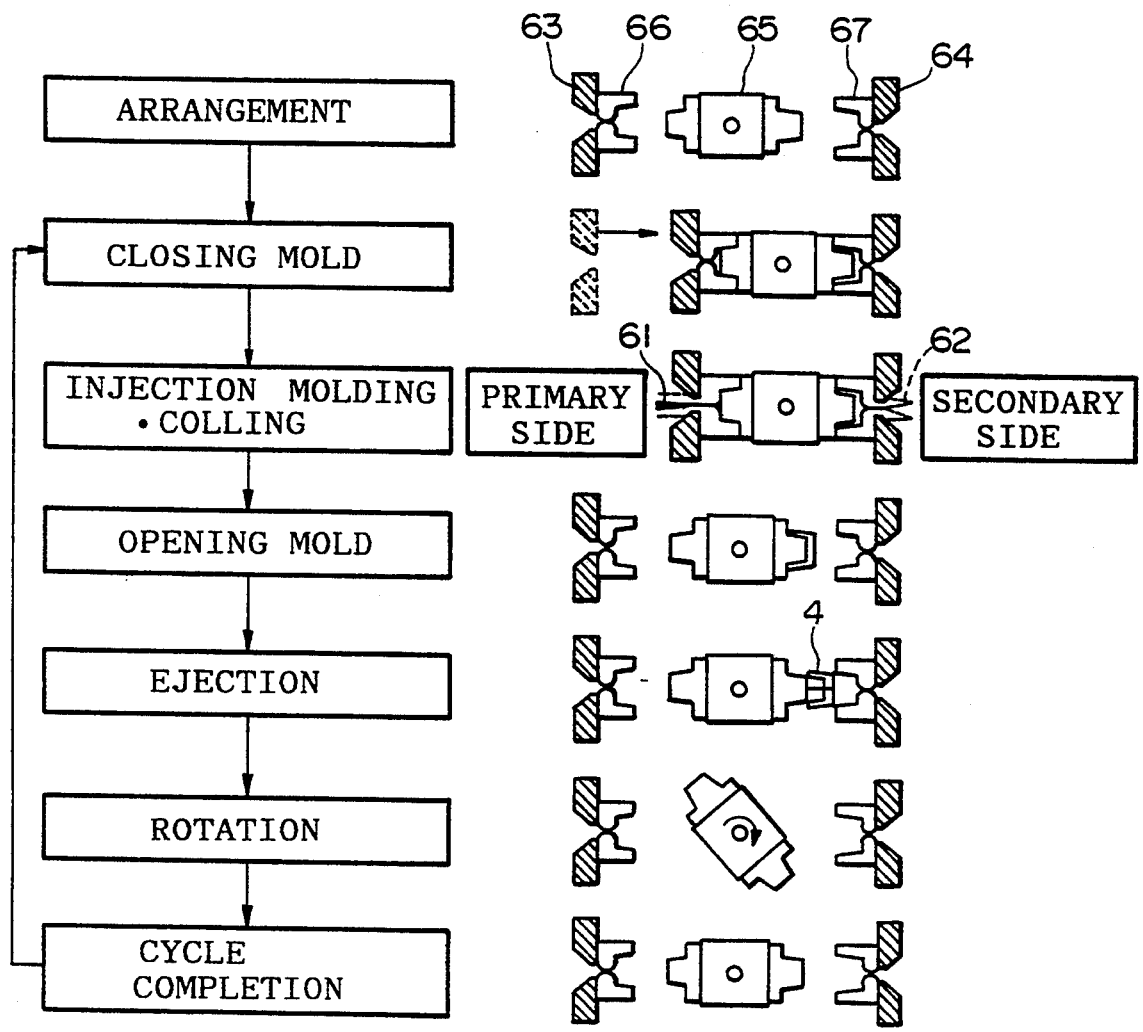
FIG. 5 is an explanatory drawing showing the standard movement mode of a two-layer injection molding device.
Figure 6:
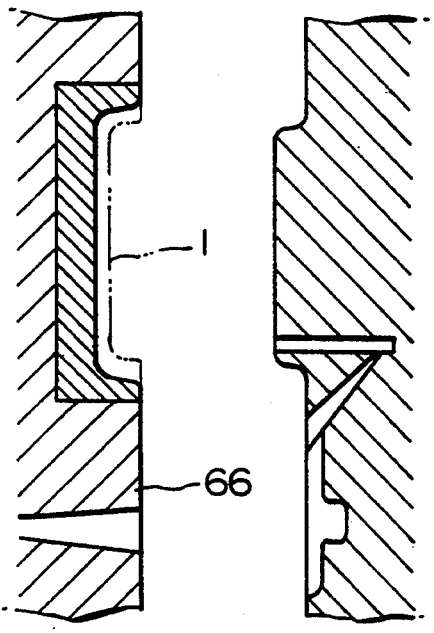
FIG. 6 is a cross sectional view of an essential portion showing the condition in which the wooden overlay sheet is positioned in the metal mold of the two-layer injection molding device.

FIG. 4 shows two-layer injection-molding device 6 which is preferably employed in the production method of composite molded article 4 of the present invention. The device is, on both sides, provided with a primary injection unit 61 and secondary injection unit 62. Furthermore, the device is provided with a rotation platen 65 which is rotatable 360° in a horizontal direction between movable platen 63 and fixed platen 64. FIG. 5 shows the standard movement mode for continuously manufacturing the composite molded article 4 employing such a device; FIG. 6 is a drawing showing the condition in which the preliminarily molded wooden overlay sheet is positioned in the metal mold of such a device.

Figure 1:
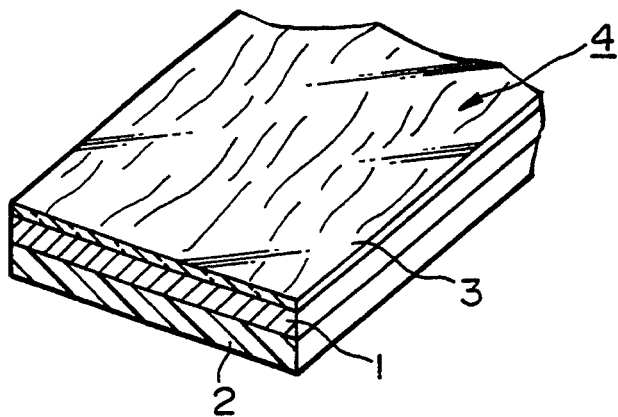
FIG. 1 is a cutaway cross sectional view showing a portion of an example of a composite molded article.

When employing the production method of the present invention and manufacturing a composite molded article, such as the one shown in FIG. 1, first the wooden overlay sheet 1 is produced.

Figure 2:
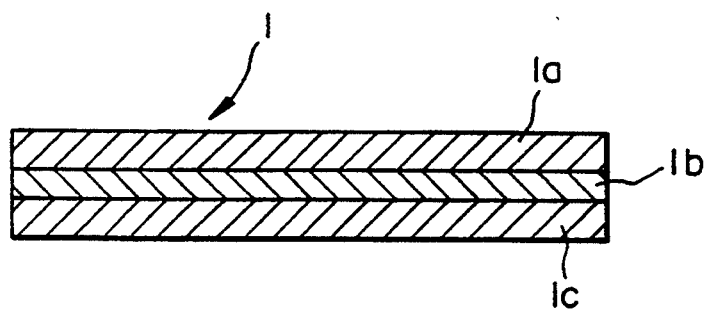
FIG. 2 is a cross sectional view showing an example of the wooden overlay sheet.

FIG. 2 shows an embodiment of wooden overlay sheet 1. Here, the product is constructed so that wooden material 1a is laminated onto the front surface of a thin metal sheet 1b, consisting of, for instance, aluminum or steel, and rear portion material 1c is laminated onto the rear side of the thin metal sheet 1b.

Wooden material 1a is formed of a wood veneer or a sliced veneer having an attractive grain pattern of a suitable thickness.

Furthermore, there is the option to provide thin metal sheet 1b to strengthen wooden material 1a; however, a structure without such a provision is also possible.

As for thin metal sheet 1b, a thickness within a range of 0.05~0.5 mm is preferably employed; if thin metal sheet 1b is too thin, reinforcement of wooden material 1a cannot be achieved, and if the thin metal sheet is too thick, the stiffness will be too great.

Furthermore, there is the option to provide rear portion material 1c in order to enhance the handling of wooden overlay sheet 1, and to improve the adhesion of wooden overlay sheet 1, which is the front surface material of composite molded article 4, and of the synthetic resin, which is used as the core material; a structure without such a provision is also possible.

For rear portion material 1c, a porous material such as a foam resin sheet or wood veneer, a non-woven fabric, or a fibrous material such as a glass fiber mat can be employed. For instance, when using a fibrous material, the weight per unit area is preferably within a range of 30~70 g/m².

When producing wooden overlay sheet 1, a method is employed wherein wooden material 1a, thin metal sheet 1b, and rear portion material 1c are laminated in order with a bonding agent therebetween and are affixed by applying heat and pressure, thus forming a unitary body.

Next, coloring treatment is performed on the front surface of the obtained wooden overlay sheet 1; that is, on the front surface of wooden material 1a, wherein a primer-based colorant is employed. It is desirable to subject the front surface of wooden material 1a to grinding processing prior to coloring processing.

With respect to the employed primer-based colorant, it is possible to use a resin-based colorant such as a vinyl butyral-based colorant, to which a suitable color pigment is added to adjust the color; furthermore, it is possible to mix in a suitable solvent. Then, it is possible to apply the colorant on wooden material 1a by a suitable method of application such as spray painting or brush coating.

Furthermore, it is possible to fix the amount of colorant applied according to the quality of the colorant and the type of wooden material; it is desirable that the application be performed uniformly.

Figure 3:
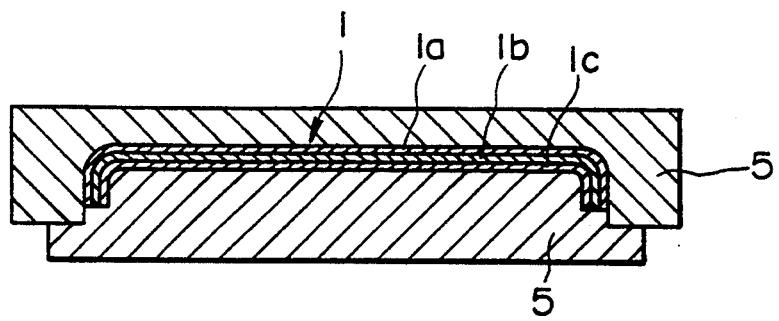
FIG. 3 is a cross sectional view showing an example of the preliminary molding process of the wooden overlay sheet.

Next, wooden overlay sheet 1, which had been subjected to coloring treatment, is cut to a predetermined shape and preliminary molding is performed. Such a preliminary molding is, as is shown in FIG. 3, performed by employing a conventional mold 5 and using a press. When performing the preliminary molding in the aforementioned way, wooden overlay sheet 1, by means of plastic deformation of the thin metal sheet thereof, maintains its form after performance of preliminary molding and does not return to the original sheet shape.

When employing a structure in which wooden overlay sheet 1 is not comprising thin metal sheet 1b, it is possible to eliminate the preliminary molding processing.

Next, synthetic resin core material 2 and transparent resin layer 3 are molded by means of two-layer injection molding. For molding synthetic resin core material 2, a resin such as ABS resin, polycarbonate resin, or modified PPO (polyphenylene oxide) resin can be employed; furthermore, for molding of transparent resin layer 3, a resin such as AS resin, acrylic resin, or ABS resin can be employed.

With regard to the order of steps, first, preliminarily molded wooden overlay sheet 1 is, as is shown in FIG. 6, positioned within primary side metal mold 66 of the injection molding device.

Thereafter, the mold is closed, and during the continuous molding, in the first step, injection-molding is performed by primary injection unit 61 only; from the second step onwards, injection-molding is performed simultaneously by primary injection unit 61 and secondary injection unit 62. At this point, the synthetic resin, which forms the core material at the rear side of wooden overlay sheet 1 is injected at the primary side metal mold 66, and the core material is thereby molded.

On the other side, at secondary side metal mold 67, the transparent synthetic resin is injection molded on the front surface of wooden overlay sheet 1, and transparent resin layer 3 is molded.

Next, the mold is opened and the product of the secondary side only is ejected and removed from metal mold 67; rotation platen 65 is rotated 180° so as to complete a cycle. By repeating the aforementioned process, it is possible to continuously manufacture composite molded article 4.

With respect to composite molded article 4, which has been molded in the aforementioned way, it is possible to achieve an apparently realistic woody texture because wooden overlay sheet 1 is in contact with transparent resin layer 3 of the front surface and is distinctly visible. Furthermore, because the front surface of wooden overlay sheet 1 is subjected to color treatment, the product appearance is excellent. Since a primer resin-based has been used, the adhesion of wooden overlay sheet 1 and transparent resin layer 3 is good; furthermore, when molding transparent resin layer 3 by means of injection-molding, there is no flow of the colorant and therefore a product with a superb finish can be obtained.

Furthermore, in the above production processing, the process of subjecting wooden overlay sheet 1 to color treatment can also be performed after the preliminary molding. It is also possible to perform the process of injecting synthetic resin core material 2, and the process of injecting transparent resin layer 3 in a non-continuous manner, and to perform color treatment of wooden overlay sheet 1 after injection-molding synthetic resin core material 2, and then perform injection molding of transparent resin layer 3.

Furthermore, if wooden overlay sheet 1 is not subjected to preliminary molding, then wooden overlay sheet 1 is positioned within primary side metal mold 66 by means of, for instance, a vacuum holding, and it is possible to perform pressure molding when the mold is closed.

EMBODIMENT 1

First, the following are provided: a thin aluminum sheet 1b of a thickness of 0.1 mm, which was subjected to a phosphate chromate membrane treatment, a walnut veneer 1a of a thickness of 0.2 mm, and a birch veneer 1c of a thickness of 0.2 mm.

Wooden overlay sheet 1, which is constructed in a three-layer fashion, was formed by laminating walnut veneer 1a onto the front surface of thin aluminum sheet 1b, employing a cross-linking urethane dispersion bonding agent, and by laminating, in the same fashion, birch veneer 1c onto the rear surface, employing a cross-linking urethane dispersion bonding agent, thereby forming a unitary body. With regard to the bonding, the amount of bonding agent applied was set at 100 g/m$^2$, and bonding was performed at a temperature of 135° C. by applying a pressure of 10 kg/cm$^2$ for a period of 10 minutes.

The vinyl butyral-resin based colorant was then prepared. 5 parts per weight of ESUREKKU-BMS (produced by Sekisui Kagaku K.K.), 50 parts per weight of methanol, and 50 parts per weight of toluene were mixed; color pigment was added and color adjustment to a predetermined color was performed.

After subjecting the front surface of the aforementioned wooden overlay sheet 1, that is, the front surface of walnut veneer 1a, to grinding processing wherein an abrasive paper with a grit number of 240 was employed, the previously prepared colorant was applied by spraying. The amount applied at this point was set at 50~100 g/m$^2$.

After subjecting the colorant to natural drying, wooden overlay sheet 1 was cut to a predetermined shape, and preliminary molding with a press was performed thereon.

Preliminarily molded wooden overlay sheet 1 was placed within metal mold 66 of a two-layer injection molding device, which is shown in FIG. 4, and the ABS resin which becomes core material 2 was injected on the rear surface of wooden overlay sheet 1 by means of primary injection unit 61. Next, rotation platen 65 was reversed, and the acrylic resin, which becomes transparent resin layer 3, was injected by means of secondary injection unit 62. The product was removed from secondary side metal mold 67, and composite molded article 4 was obtained.

Composite molded article 4, which has been obtained in the aforementioned way, is a superb product with regard to its apparently realistic woody texture. Furthermore, on the front surface of wooden overlay sheet 1, no pattern due to flow of colorant was visible, and there was no separation of wooden overlay sheet 1 and transparent resin layer 3.

EMBODIMENT 2

Wooden overlay sheet 1 was formed in the same way as in embodiment 1; that is, a walnut veneer 1a of a thickness of 0.2 mm was laminated onto thin aluminum sheet 1b; however with the exception that an acrylic non-woven fabric 1c with a weight per unit area of 50 g/m$^2$ was laminated onto the rear surface; composite molded article 4 was produced by proceeding in the same way as in embodiment 1.

The obtained composite molded article 4 was a superb product with regard to its apparently realistic woody texture. Furthermore, on the front surface of wooden overlay sheet 1, no pattern due to flow of colorant was visible, and there was no separation of wooden overlay sheet 1 and transparent layer 3.

EMBODIMENT 3

Wooden overlay sheet 1 was formed in the same way as in embodiment 1; that is, a walnut veneer 1a of a thickness of 0.2 mm was laminated onto thin aluminum sheet 1b; however, a surfacing mat (glass fiber mat) 1c with a weight per unit area of 70 g/m$^2$ was laminated onto the rear surface; composite molded article 4 was then produced by proceeding in the same way as in embodiment 1.

The obtained composite molded article 4 is a superb product with regard to its apparently realistic woody texture. Furthermore, on the front surface of wooden overlay sheet 1, no pattern due to flow of the colorant was visible, and there was no separation of wooden overlay sheet 1 and transparent layer 3.

Embodiments of the present invention have been described above; however, the present invention is not limited to the aforementioned embodiments, but also encompasses various variations thereof.

What is claimed is:

1. A production method for a composite molded article, the method comprising the steps of:
   a) subjecting a front surface of a wooden overlay sheet, having a wooden material on the front surface thereof, to color treatment with a colorant including a resin-based primer;
   b) injection-molding a transparent resin layer onto the front surface of the color-treated wooden overlay sheet; and
   c) molding a synthetic resin core material onto the rear surface of the color-treated wooden overlay sheet.

2. A production method according to claim 1, wherein the primer comprises vinyl butyral resin and wherein the colorant further includes color pigment.

3. A production method according to claim 1, wherein the transparent resin layer is formed utilizing a resin selected from the group consisting of AS resins, acrylic resins, and ABS resins.

4. A production method according to claim 1, wherein the synthetic resin core material is formed utilizing a resin selected from the group consisting of ABS resins, polycarbonate resins, and modified polyphenylene oxide resins.

5. A production method according to claim 1, wherein the front surface of the wooden overlay sheet is subjected to grinding prior to color treatment.

6. A production method according to claim 1, wherein the molding of the synthetic resin core material is performed by injection-molding.

7. A production method according to claim 6, wherein the molding of the transparent resin layer and of the synthetic resin core material are consecutively performed by two-layer injection molding.

8. A production method for a composite molded article comprising the steps of:

a) bonding a thin metal sheet onto the rear surface of a wooden material so as to form a wooden overlay sheet;

b) subjecting a front surface of a wooden overlay sheet to color treatment with a colorant including a resin-based primer;

c) injection-molding a transparent resin layer onto the front surface of the color-treated wooden overlay sheet; and d) molding a synthetic resin core material onto the rear surface of the color-treated wooden overlay sheet.

9. A production method according to claim 8, wherein the wooden overlay sheet is formed by bonding a porous material to a non-bonded surface of the thin metal sheet.

10. A production method according to claim 8, wherein the wooden overlay sheet is formed by bonding a fibrous material to a non-bonded surface of the thin metal sheet.

11. A production method according to claim 8, wherein the primer comprises vinyl butyral resin and wherein the colorant further includes color pigment.

12. A production method according to claim 8, wherein the transparent resin layer is formed utilizing a resin selected from the group consisting of AS resins, acrylic resins, and ABS resins.

13. A production method according to claim 8, wherein the resin core material is formed utilizing a resin selected from the group consisting of ABS resins, polycarbonate resins, and modified polyphenylene oxide resins.

14. A production method according to claim 8, wherein the front surface of the wooden overlay sheet is subjected to grinding prior to the color treatment.

15. A production method according to claim 8, wherein the wooden overlay sheet is subjected to preliminary molding after being color treated, and a transparent resin layer is formed on the front surface of the color-treated wooden overlay sheet.

16. A production method according to claim 8, wherein the surface of the wooden overlay sheet is color treated after preliminary molding.

17. A production method according to claim 8, wherein the molding of the synthetic resin core material is performed by means of injection-molding.

18. A production method according to claim 17, wherein the molding of the transparent resin layer and of the synthetic resin core material is consecutively performed employing a two layer injection-molding device.

19. A composite molded article produced by the method as recited in claim 1.

20. A composite molded article produced by the method as recited in claim 8.

* * * * *